Feb. 20, 1945.　　　P. A. NOXON　　　2,369,845
GYRO CAGING DEVICE
Filed Nov. 13, 1942　　　4 Sheets-Sheet 1

INVENTOR.
Paul A. Noxon
BY
ATTORNEY

Feb. 20, 1945. P. A. NOXON 2,369,845
GYRO CAGING DEVICE
Filed Nov. 13, 1942 4 Sheets-Sheet 2
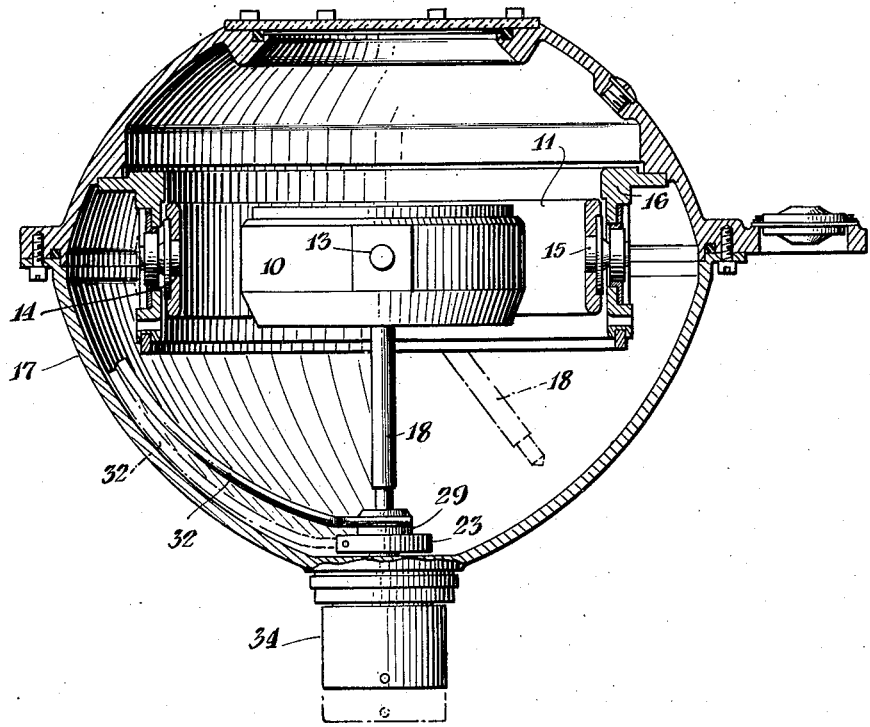
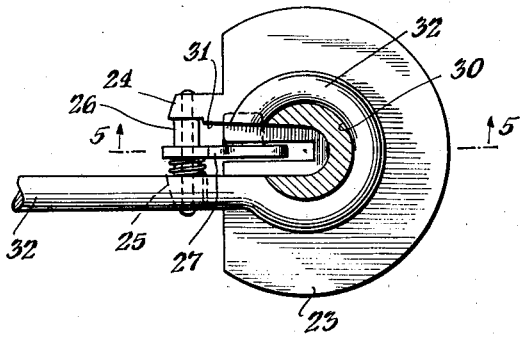
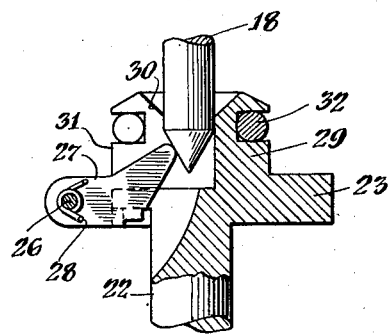
INVENTOR.
Paul A. Noxon
BY
ATTORNEY

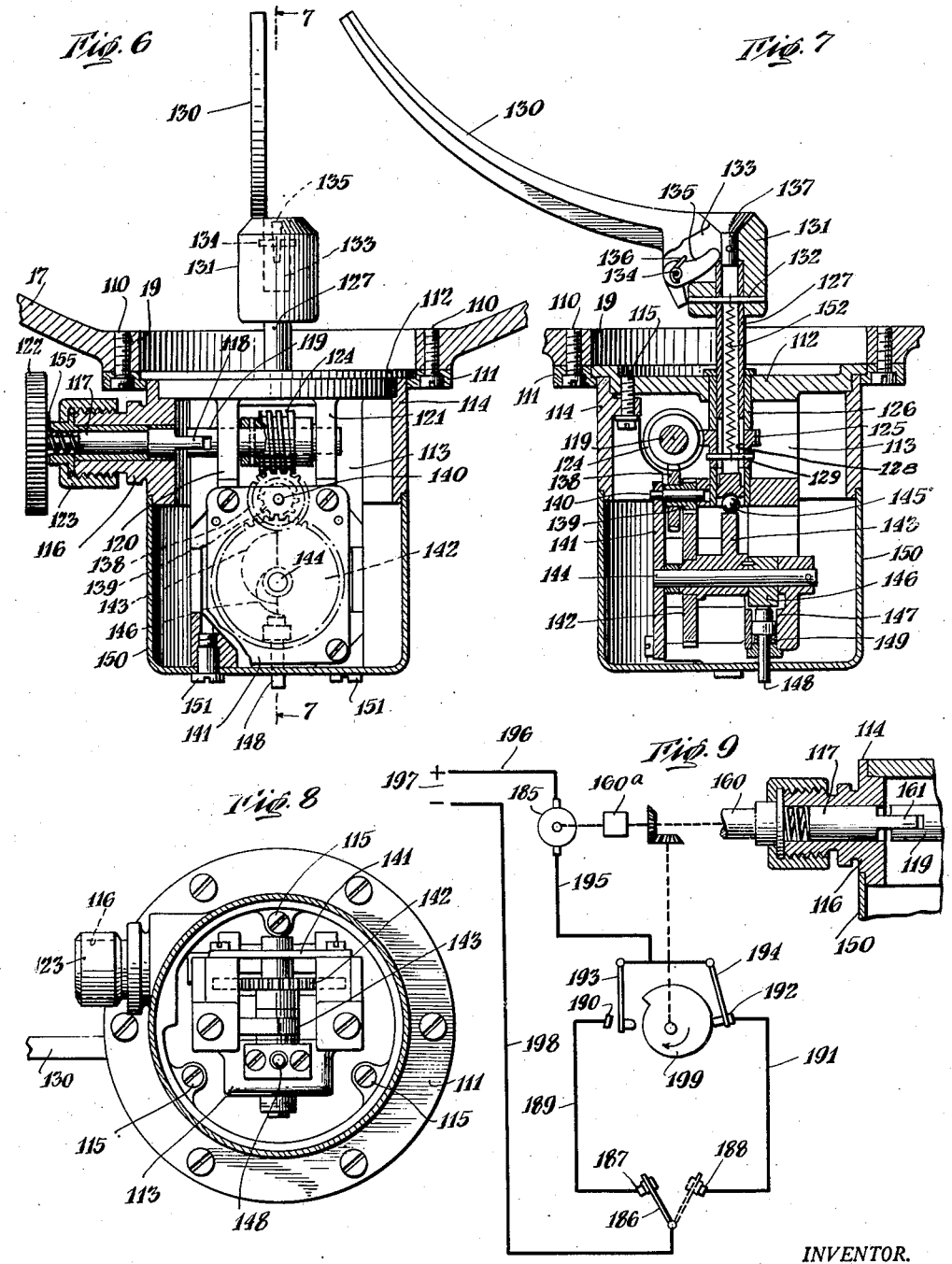

Feb. 20, 1945. P. A. NOXON 2,369,845
GYRO CAGING DEVICE
Filed Nov. 13, 1942 4 Sheets-Sheet 4

INVENTOR.
Paul A. Noxon
BY
ATTORNEY

Patented Feb. 20, 1945

2,369,845

UNITED STATES PATENT OFFICE 2,369,845

GYRO CAGING DEVICE

Paul A. Noxon, Tenafly, N. J., assignor to Bendix Aviation Corporation, Bendix, N. J., a corporation of Delaware Application November 13, 1942, Serial No. 465,499

25 Claims. (Cl. 74—5)

This invention relates to gyroscopic devices such as artificial horizons or gyro verticals, for example, and more particularly to novel apparatus for caging and centralizing such devices.

It is well known to those skilled in the art that it is desirable, under certain flight conditions, to cage and center spinning gyroscopes where the latter are used as navigational instruments. For example, unless a gyroscope, mounted upon a craft which is subjected to violent maneuvers, is caged and centered prior to such maneuvers, it will precess abnormally and exert severe strains and possible damage to its supporting bearings. Also, it may be desirable, where a craft provided with an automatic pilot has encountered abnormal flying conditions, to lock and center the gyroscope of the automatic pilot. Heretofore, various devices have been provided for the foregoing purpose, but they have been bulky and complicated in structure.

An object of the present invention is to provide novel caging means for gyroscopes which are simple in design and rapid in operation.

Another object of the invention is to provide novel caging means for centering and locking gyroscopic devices which utilize the principle that a spinning gyro will precess when a disturbing force is applied thereto.

A further object of the invention is to provide a novel artificial horizon or gyro vertical having caging means therefor which act to precess the gyro to a central position where it may be locked and maintained in a caged condition.

Another object of the invention is to provide novel caging apparatus for gyroscopic devices, which is adapted to be remotely controlled either by a manual operation or through power means.

A further object of the invention is to provide novel caging means for a gyroscopic device, which comprises a slidable and rotatable finger adapted to engage and cause the gyro to precess to a central position in which it may be locked.

The above and further objects and novel features of the invention will appear more fully from the following detailed description when the same is read in connection with the accompanying drawings. It is to be expressly understood, however, that the drawings are for purposes of illustration only and are not intended as a definition of the limits of the invention.

In the drawings wherein like reference characters refer to like parts throughout the several views, Figure 1 is a top plan view, partially in section, of one form of a gyroscopic device embodying the subject matter of the present invention;

Figure 3 is a vertical section view taken substantially along line 3—3 of Figure 2;

Figure 4 is a fragmentary detail view of a portion of the novel caging mechanism of the present invention;

Figure 5 is a vertical section view taken substantially along line 5—5 of Figure 4;

Figure 6 is a side elevation view, in section, of a slightly modified form of the novel caging device of the present invention;

Figure 7 is a vertical section view taken substantially along line 7—7 of Figure 6;

Figure 8 is an end elevation view of the structure of Figure 6 with the lower housing removed;

Figure 9 is a schematic and fragmentary view illustrating one manner for operating the modification of Figure 6;

Figure 1:
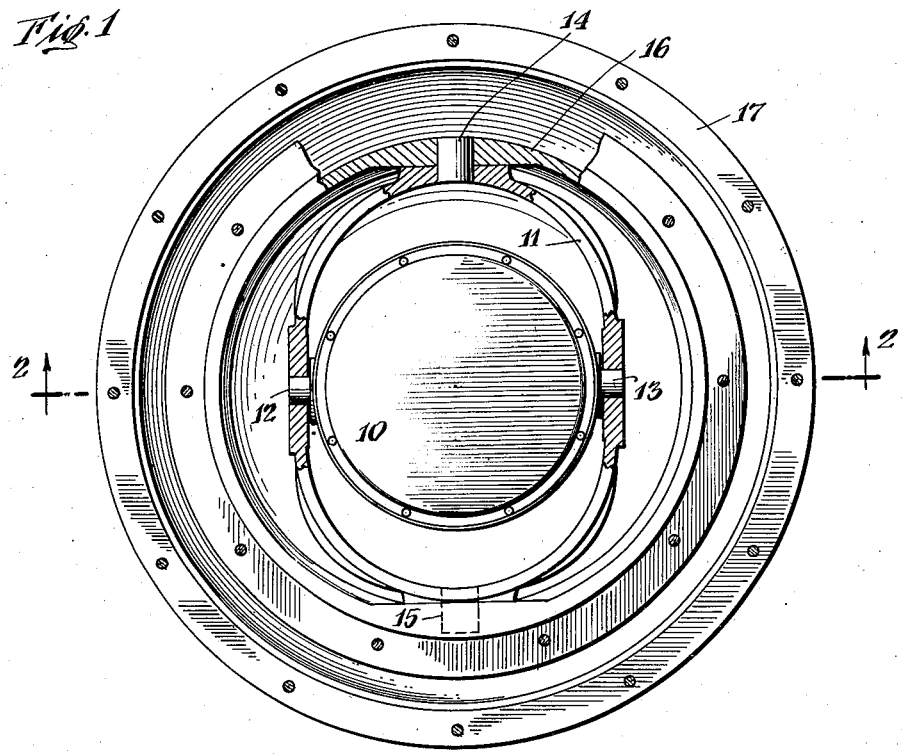

The novel apparatus of the present invention is illustrated in Figure 1 as applied to an artificial horizon gyro having a rotor (not shown), which may be driven pneumatically or electrically, mounted within a casing 10, for spinning about a normally vertical axis. The rotor casing is mounted for oscillation about a horizontal axis within a gimbal ring 11 by way of suitable trunnions 12 and 13 fastened to the rotor casing. The gimbal ring, in turn, is mounted for oscillation about a second horizontal axis by way of outer trunnions 14 and 15 which rotatably support the gimbal and rotor casing within an annular bracket 16, the latter being rigidly fastened within an instrument housing 17 which is adapted for mounting the gyroscope upon an aircraft or other mobile vehicle.

The gyro rotor is thus provided with three degrees of freedom, and the spin axis thereof may be maintained vertical by way of well known erection means such as, for example, that shown in the United States Patent to Robert Alkan, No. 2,159,118, issued May 23, 1939.

A caging pin 18 is secured to the bottom of rotor casing 10 and projects downwardly with its longitudinal axis arranged to be at all times coaxial with the rotor spin axis. The base of housing 17 is provided with an annular flange 19 having an opening therein for mounting the novel means of the present invention in a manner to cooperate with caging pin 18 whereby the gyroscope may be caged and centralized in a manner to presently appear.

A bushing 20 is fastened to flange 19 in any suitable manner such as by screws 21 and is provided with a central aperture for slidably and rotatably mounting a rod or shaft 22 therein. The upper end of rod or shaft 22 has secured thereto or formed integrally therewith a split flange or collar 23 which is provided with two arms 24 and 25 (Figure 4) defining bearing surfaces for a transverse shaft 26 which has mounted thereon a detent or locking member 27 normally resiliently held in the position of Figure 5 by way of a coiled spring 28. The upper end of collar 23 is provided with an annular member 29 of decreased diameter and having a central aperture 30 therein together with a slot or recess 31 which communicates with the central aperture and is in alignment with the opening between arms 24 and 25 of collar 23.

A curved finger 32 (Figure 3) is secured to or formed integrally with member 29 to one side of recess 31 so that rotation of shaft 22 sweeps finger 32 within housing 17 until the finger engages caging pin 18 which is caused to move along the finger toward a central position until the conical end of the pin enters recess 31, presses detent 27 downwardly against the action of spring 28, and comes to rest within aperture 30. With pin 18 resting in aperture 30, spring 28 urges detent 27 to its position of Figure 5 so that the pin is locked in a central position and the gyro is caged.

Figure 2:
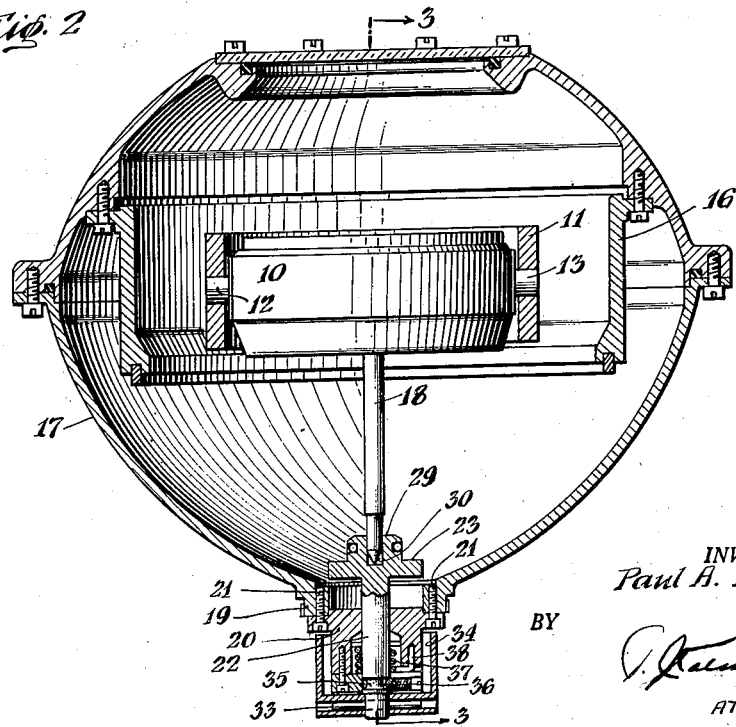
Figure 2 is a vertical section view taken substantially along line 2—2 of Figure 1.

At its lower end, shaft 22 is fastened by way of a lock pin 33 (Figure 2) to an actuating knob 34 which is adapted for turning as well as longitudinally sliding the shaft 22 relative to rotor casing 10. Figures 2, 3 and 5 show actuating knob 34 in a caged position wherein it has been pushed upwardly so that caging pin 18 has been centered and is held within aperture 30. In order that knob 34, as well as shaft 22, may be maintained in a caged position, shaft 22 is provided with an annular groove 35 with which cooperates a spring pressed detent in the form of a ball member 36.

It will be obvious to those skilled in the art that if the gyro rotor were spinning in a clockwise direction and finger 32 were turned in a counterclockwise direction to engage caging pin 18, the rotor would be caused to precess away from shaft 22 rather than toward the shaft. To insure that the shaft together with finger 32 may be operated in a proper direction to cage the gyroscope which, in the case of a gyro rotor spinning in a clockwise direction, must be in a clockwise direction, a coil spring 37 surrounding shaft 22 is provided so that the shaft may be turned in a clockwise direction by knob 34 but not in a counterclockwise direction. Spring 37 is anchored at its lower end within a recess 38 formed in bushing 20 and its upper end is free so that in rotating knob 34 and shaft 22 in a clockwise direction the spring will unwind but a counterclockwise rotation will cause the spring to wind and tighten about the shaft. Should it be desired to spin the gyro rotor in a counterclockwise direction, spring 37 must be reversed so that shaft 22 will be free to rotate in a counterclockwise but not in a clockwise direction.

Considering now the operation of the above described novel caging apparatus, it is assumed that knob 34 as well as finger 32 are in their downward or uncaged position, as indicated in dotted lines in Figure 3, so that the rotor is free to assume various positions within housing 17 without any interference between caging pin 18 and either finger 32 or member 29.

It will be assumed, furthermore, that the rotor and its casing are inclined relative to housing 17 so that caging pin 18 is in the dotted line position of Figure 3 and a condition has arisen during flight making it desirable to cage the gyroscope. Knob 34 is pressed inwardly to move finger 32 from its dotted to the full line position of Figure 3 and, subsequently, the knob is rotated so that finger 32 sweeps in a clockwise direction within the housing until it engages pin 18. Since the rotor is spinning, the torque exerted upon the rotor through engagement of finger 32 with pin 18 causes the rotor to precess toward a central position and along the finger, exerting a pressure on the finger which is transmitted to the knob to oppose rotation thereof. Rotor movement continues until the conical end of the pin passes into recess 31 of member 29, depresses detent 27, and comes to rest within aperture 30 at which time spring 28 urges the detent to a normal position wherein the gyroscope is locked. As the rotor and pin attain a central position, the opposing force upon the knob is no longer exerted so that the knob is freely rotatable indicating to the operator that the gyro is caged.

To subsequently uncage the gyroscope, knob 34 is pulled downwardly to an uncaged position drawing shaft 22 and finger 32 downwardly to the dotted line position of Figure 3 so that pin 18 is released from aperture 30 and is free to move at will with the gyro as the craft tilts either about its lateral or longitudinal axes.

Knob 34 of the above described novel caging apparatus is adapted for manual operation only and requires a separate turning as well as a separate sliding motion. Such an arrangement is desirable where the artificial horizon or gyro vertical is mounted on an instrument panel before the pilot. However, in some cases where the gyroscope is used to stabilize the pick-up device of an earth inductor compass which is mounted in the craft tail assembly, for example, remote caging control is desirable. To this end a slightly modified form of the invention is provided which may be controlled remotely and, as illustrated in Figures 6-8, inclusive, comprises a caging device having a finger which may be actuated to turn and slide simultaneously relative to the rotor casing.

Referring now to Figure 6, the annular flange 19 formed at the base of gyro housing 17 has secured thereto by suitable means, such as screws 110, a ring 111 formed with an internal flange upon which rests a plate 112 of an inner casing 113. Surrounding inner casing 113 is a cylindrical shell 114 which is secured by way of suitable means, such as screws 115, to plate 112 of the inner casing.

Shell 114 has secured thereto or formed integrally therewith an apertured boss 116 which receives a shaft 117 provided with a finger 118 adapted for cooperation with the bifurcated end of a shaft 119 journalled for rotation within bearing arms 120 and 121 carried by inner casing 113.

At its free end, shaft 117 is provided with an actuating knob 122 which is held against longitudinal movement relative to shaft 119 by means of a lock nut 123 cooperating with the outer periphery of boss 116, the latter being screw threaded for this purpose. A worm 124 is pinned to shaft 119 for rotation therewith and meshes with a worm gear 125 (Figure 7) which is secured to a hollow bushing 126 rotatably mounted within plate 112 of the inner casing. Bushing 126 slidably receives therein a hollow shaft 127 which is provided, at its lower end, with a transverse slot 128 for receiving a transverse pin 129 secured to worm gear 125 and, at its upper end, with a curved finger 130 formed integrally with or secured to a collar 131, the latter being fastened to shaft 127 by means of a pin 132.

Curved finger 130 is substantially similar to finger 32 of Figure 3, and, as there shown, finger 130 is connected with collar 131 to one side of a recess 133, formed within the collar, within which is a transverse shaft 134 mounting a detent or locking member 135 normally urged to the position of Figure 7 by way of a resilient spring 136. Collar 131, furthermore, is provided with a central aperture 137 which is coaxial with shaft 127 and which communicates with recess 133. As described above in connection with Figures 1–5, inclusive, when finger 130 engages caging pin 18, the latter passes along the finger into recess 133, depresses detent 135 and comes to rest within aperture 137 of collar 131 at which time spring 136 urges the detent to the position of Figure 7 wherein caging pin 18 is locked.

By virtue of the pin and slot connection between shaft 127 and worm gear 125, the former is caused to rotate when the latter is actuated by worm wheel 124. In addition to driving worm gear 125, worm 124 also meshes with a second worm gear 138 which, together with a pinion 139, is secured to a shaft 140, the latter being journalled at one end in casing 113 and at its other end in a sideplate 141 which is fastened to the inner casing.

Pinion 139 is in driving engagement with a large gear 142 which is fixed to a relatively large cam 143, the latter being splined to a shaft 144 which, at one end, is mounted in plate 141 and, at its other end, in inner casing 113. Cam 143 is arranged beneath the lower end of shaft 127 and, if desired, a bearing surface in the form of a ball 145 may be spun into the bottom of the shaft and thus provide a positive engagement between the shaft and the cam surface when a caging operation is initiated.

Also mounted on shaft 144 for movement with cam 143 is a relatively smaller cam 146 which is arranged adjacent a cylinder 147 formed within inner casing 113. Cylinder 147 receives a plunger 148 which is normally urged upwardly against cam 146 by virtue of a spring 149. The foregoing cams and operating gears are enclosed within a cup-shaped housing 150 which is secured to the base of inner casing 113 by any suitable means such as screws 151. Housing 150, furthermore, is provided with an aperture aligned with cylinder 147 so that under certain conditions, to presently appear, plunger 148 will project beneath the housing.

It will now become apparent that actuation of worm wheel 124 by way of knob 122 not only rotates shaft 127 through worm gear 125 and the pin and slot connection but also displaces or slides the shaft toward the rotor casing by reason of the fact that cam 143 is actuated through worm gear 138, pinion 139 and gear 142. In Figure 7, cam 143 is shown in its maximum position wherein shaft 127 has been raised to a caging position and simultaneously therewith cam 146 has lowered plunger 148 to its lowermost position beneath housing 150. The pilot need merely to run his finger along the base of housing 150 and when he finds plunger 148 to be projected downwardly he is informed that the gyro is caged.

Knob 122 can be rotated in one direction only, in the same manner as knob 34 of Figure 2, by virtue of a spring 155 which is sleeved about shaft 117 to be free at one end and anchored at its other end adjacent knob 122 to the bearing provided between shaft 117 and lock nut 123. Spring 155, like spring 37 of Figure 2, permits rotation of shaft 127 and finger 130 in one direction only. To uncage the gyro, therefore, knob 122 is rotated in the same direction as for the caging operation until cam 143 passes away from shaft 127 and the latter, under the influence of a spring 152 anchored at one end to pin 129 and at its other end to pin 132, is pulled downwardly away from caging pin 18 to uncage the gyroscope. Simultaneously with rotation of cam 143, cam 146 is rotated to release plunger 148 so that spring 149 urges the plunger upwardly into cylinder 147 and out of the aperture of housing 150.

Instead of the separate turning and raising or lowering motions that have to be applied to shaft 22 of Figure 2, shaft 127 of Figures 6 and 7 is turned and raised simultaneously. Finger engagement with the caging pin is the same as before so that the pin passes into the central aperture 137 of collar 131 to be locked there in a centralized position.

Figure 10:
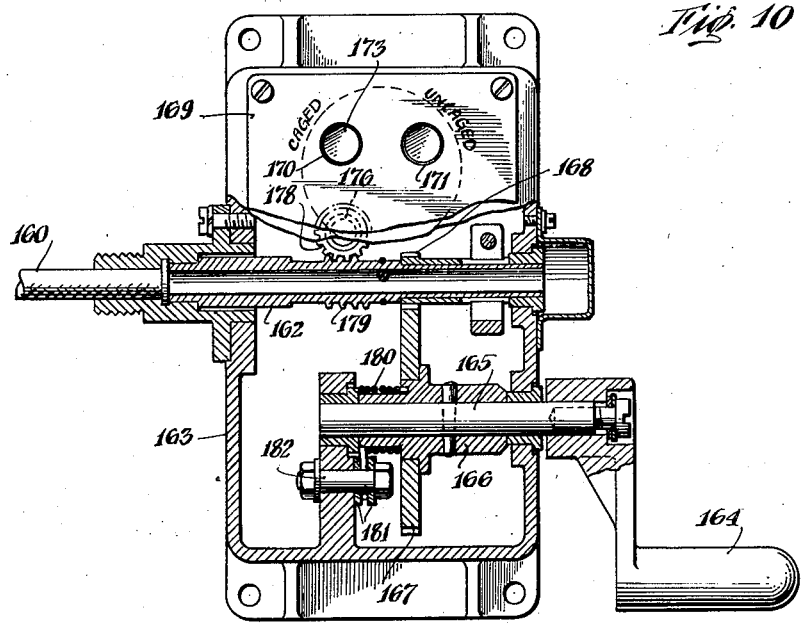
Figure 10 is a front elevation view, partially in section, of a second operating means for the novel apparatus of Figure 6; and, Figure 11 is a side elevation view, partially in section, of the structure of Figure 10.

In order to adapt the novel caging apparatus above described for remote manual control, knob 122 and shaft 117 of Figure 6 are replaced with a flexible cable 160 (Figure 9) which has a finger 161, similar to finger 118 of shaft 117, for engaging the bifurcated end of shaft 119 of Figure 6. The opposite end of cable 160 is suitably secured to be driven by a hollow shaft 162 which is mounted within a housing 163 as shown in Figure 10. With this arrangement, the artificial horizon or gyro vertical may be arranged at some remote part of the craft while housing 163 is mounted near the pilot so that when it is desired to cage the gyro he grasps a crank 164 and actuates cable 160 to operate worm wheel 124 of Figure 6.

Manual crank 164 is fastened to a shaft 165 which is rotatably mounted within housing 163. A sleeve 166, carrying thereon a gear 167, is pinned to shaft 165 to rotate therewith. A pinion 168 is splined to shaft 162 and meshes with gear 167 so that, upon actuation of manual crank 164, shaft 162 is turned together with cable 160.

Indicating means are provided to inform the pilot that the gyro has been caged or uncaged. To this end, housing 163 is provided with an opening closed by a transparent glass 168 (see Figure 11) which is held in place by a cover plate 169, the latter being provided with two apertures 170 and 171. Mounted to the rear of glass 168 for relative movement thereto is a disc 172 having a circular mark 173 thereon which may be made of some light color in direct contrast with a dark color applied to the disc.

Disc 172 is rotatably mounted by means of a shaft 174 which, at its free end, has a gear 175 splined thereto. This latter gear meshes with a pinion 176 mounted on a shaft 177, a gear 178 being secured to the free end of the shaft. Shaft 162, provided for driving cable 160, has secured thereto or formed integrally therewith a worm 179 so that actuation of shaft 162 by way of crank 164 turns disc 172 and its mark 173 relative to apertures 170 and 171. The apparatus is so designed that rotation of crank 164 to cage the gyro causes mark 173 of disc 172 to pass in front of aperture 170 at which time the pilot is informed that the gyro is caged. If desired, the coverplate may have inscribed thereon adjacent aperture 170 the word "Caged" as shown in Figure 10.

As before, crank 164 may be rotated in one direction only and to this end a suitable spring 180 is coiled about shaft 165 in such a manner as to be free at one end and anchored at its opposite end between plates 181 held together by a bolt 182. To uncage the gyro, crank 164 is rotated in the same direction as before until cam 143 of Figure 6 moves in a counterclockwise direction away from shaft 127. Spring 152 then urges the shaft downwardly to an uncaged position and simultaneously therewith mark 173 passes from aperture 170 to aperture 171 to visually inform the pilot that the gyro is uncaged. The word "Uncaged" may be inscribed on coverplate 169 adjacent aperture 171.

The operation of shaft 127 and caging finger 130 of Figures 6 and 7 to centralize and lock caging pin 18 of the rotor casing to cage the gyroscope by the remote manual control apparatus above described is similar to the operation described in connection with the use of manual knob 122.

Figure 11:
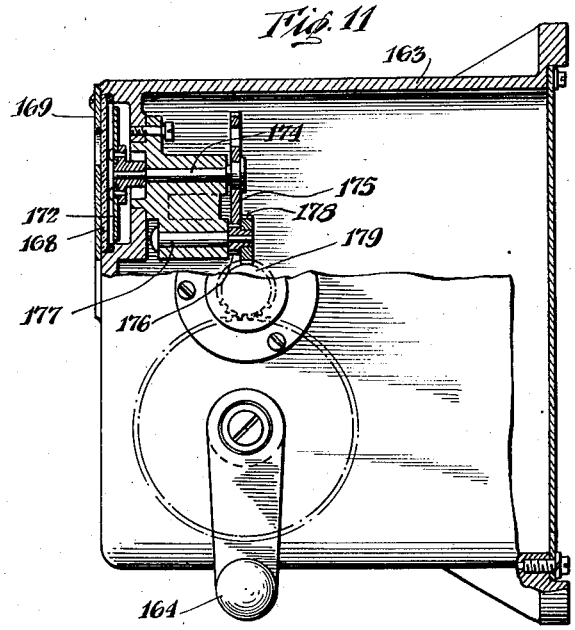

It may be desirable to control the caging apparatus remotely but through some auxiliary power means instead of the manual control described in connection with Figures 10 and 11. In place of the latter structure a suitable motor 185 (Figure 9) may be provided which drivably connects with cable 160 through a speed reduction gearing 160a to operate shaft 119 and worm wheel 124 of Figure 6.

A switch 186 is provided for controlling the operation of the motor and is adapted for cooperating with contacts 187 and 188, the former being an "uncaging" contact and the latter a "caging" contact. A lead 189 connects contact 187 with a contact 190 while a similar lead 191 connects contact 188 with a contact 192. A pair of spring contacts 193, 194 are provided for cooperation with contacts 190 and 192 and are connected by way of a lead 195 with one side of the motor. The opposite side of the motor connects by way of a lead 196 with one side of a suitable source 197, the other side of which connects through a conductor 198 with switch 186. Coupled with the motor through a suitable connection is a rotatable cam 199 which is arranged between spring contacts 193 and 194 to selectively urge spring contact 193 into engagement with corresponding contact 190 or spring contact 194 into engagement with contact 192. Both contacts 193 and 194 are suitably insulated from cam 199.

Assuming that the gyro is uncaged, switch 186 will be in engagement with contact 187 but contacts 190 and 193 will be open because, during the uncaging operation, cam 199 has been rotated by motor 185 in a clockwise direction to the position of Figure 9 where the cam has urged contact 194 into engagement with contact 192. Should it be desired to subsequently cage the gyro, switch 186 is thrown into engagement with contact 188 so that the circuit is completed from one side of source 197 through lead 198, switch 186, contact 188, lead 191, contacts 192, 194, to one side of motor 185 by way of lead 195, and back to the source by way of lead 196. The motor is thus energized and drives cable 160 to lift and rotate finger 130 of Figure 6 to cage the gyro. Simultaneously therewith cam 199 is rotated until the gyro is caged at which time the high point on the cam has passed contact 194 and the latter, because of its inherent resiliency, swings to a normal position to break contacts 194 and 192 to open the circuit and de-energize the motor. As contacts 194 and 192 are opened, cam 199 moves to close contacts 193 and 190 into engagement to place the apparatus in condition for an uncaging operation. To uncage the gyro, switch 186 is thrown into engagement with contact 187 and motor 185 is again energized until such time as it moves cam 199 sufficiently to open contacts 193, 190 and close contacts 192, 194.

Cam 199 is arranged to rotate at a ratio of one to one with cam 143 of Figure 6 and connects with the driving shaft of motor 185. Cable 160, like cam 199, is also drivably connected with the motor and will be rotated in one direction only so that finger 130 will be actuated in the same manner as before.

There is thus provided, by the present invention, a novel and desirable caging apparatus adapted for manual operation either at the gyro or at a remote point and which, if so desired, may be driven through suitable power means in place of the manual control.

Although several embodiments of the present invention have been illustrated and described in detail, it is to be expressly understood that the invention is not limited thereto. Various changes can be made in the design and arrangement of the parts without departing from the spirit and the scope of the invention as will now be understood by those skilled in the art. For a definition of the limits of the invention, reference will be had primarily to the appended claims.

I claim:

1. In a caging and centralizing device for a universally mounted gyroscope comprising a rotor having a normally vertical spin axis and a rotor casing therefor, the combination with the casing of a pin projecting therefrom, and means comprising a finger rotatable about an axis coaxial with said normally vertical spin axis for engaging said pin to cause said rotor to precess whereby said casing is centralized.

2. In a caging and centralizing device for a universally mounted gyroscope comprising a rotor having a normally vertical spin axis and a rotor casing therefor, the combination with the casing of a pin projecting therefrom, a member rotatably mounted about an axis coaxial with said normally vertical spin axis for engaging said pin whereby said rotor is caused to precess to center and lock said gyroscope about two axes thereof, and control means for actuating said member.

3. In a caging and centralizing device for a universally mounted gyroscope having a rotor provided with a normally vertical spin axis and a rotor casing therefor, the combination with the casing of a pin projecting therefrom, a longitudinally slidable finger mounted for rotation about an axis coaxial with said normally vertical axis for engaging said pin whereby said rotor is caused to precess to a central position to center and lock said casing, and control means for sliding and rotating said finger.

4. In a caging and centralizing device for a universally mounted gyroscope having a rotor provided with a normally vertical spin axis and a rotor casing therefor, the combination with the casing of a pin projecting therefrom, a curved finger mounted for movement about an axis coaxial with said normally vertical spin axis, and means for moving said finger to engage said pin to cause precession of said rotor to cage said gyroscope and for disengaging said finger from said pin to uncage said gyroscope.

5. In a caging and centralizing device for a universally mounted gyroscope having a rotor provided with a normally vertical spin axis and a rotor casing therefor, the combination with the casing of a pin projecting therefrom, a finger for engaging said pin to cause said rotor to precess to a central position to cage said gyroscope, means comprising a longitudinally slidable member supporting said finger for turning about an axis coaxial with said normally vertical spin axis, and control means for actuating said last-named means.

6. In a gyro vertical having a rotor provided with a normally vertical spin axis and a rotor casing therefor together with means mounting the casing for oscillation about two mutually perpendicular axes other than said spin axis, a pin carried by and projecting from said casing, a finger for engaging said pin to cause said rotor to precess to a central position to centralize said casing about said two mutually perpendicular axes, a slidable shaft supporting said finger for turning about an axis coaxial with said normally vertical spin axis, and control means for actuating said shaft.

7. In a caging and centralizing device for a universally mounted gyroscope comprising a rotor having a normally vertical spin axis and a rotor casing therefor, the combination with the casing of a pin projecting therefrom, a finger for engaging said pin to cause said rotor to precess to a central position to centralize said gyroscope about two axes thereof, a slidably mounted shaft supporting said finger for turning about an axis coaxial with said normally vertical spin axis, said shaft being provided with a recess and a locking means for receiving and locking the pin within said recess, and control means for operating said shaft.

8. In a gyro vertical having a rotor provided with a normally vertical spin axis and a rotor casing therefor, a gimbal ring supporting said casing for oscillation about a horizontal axis perpendicular to said spin axis, a housing supporting said gimbal ring and said casing for oscillation about a second horizontal axis mutually perpendicular to said first two axes, the combination with the casing of a pin projecting therefrom, and means supported by said housing comprising a finger mounted for turning about an axis coaxial with said normally vertical spin axis for engaging said pin to cause said rotor to precess along said finger to a central and locked position.

9. In a gyro vertical having a rotor provided with a normally vertical spin axis and a rotor casing therefor, a gimbal ring supporting said casing for oscillation about a horizontal axis perpendicular to said spin axis, a housing supporting said gimbal ring and said casing for oscillation about a second horizontal axis mutually perpendicular to said first two axes, the combination with the casing of a pin projecting therefrom, means supported by said housing comprising a finger mounted for turning about an axis coaxial with said normally vertical spin axis for engaging said pin to cause said rotor to precess along said finger to a central position, and a shaft provided with a recess and a locking member included in said last-named means for receiving and locking said pin in its central position.

10. In combination with a gyro vertical having a rotor mounted for spinning about a normally vertical axis, a casing for said rotor and an outer support mounting said casing for freedom about two mutually perpendicular horizontal axes, a pin carried by said casing, a rotatable torque exerting member for engaging said pin to center said casing about said two mutually perpendicular horizontal axes by causing said rotor to precess along said member to a normally central position, and means for bringing said member into operation.

11. In an artificial horizon having a rotor provided with a normally vertical spin axis and a rotor casing therefor, a gimbal ring supporting said casing for oscillation about a horizontal axis perpendicular to said spin axis, a housing supporting said gimbal ring and said casing for oscillation about a second horizontal axis mutually perpendicular to said first two axes, the combination with the casing of a pin projecting therefrom, means supported by said housing comprising a finger mounted for turning about an axis coaxial with said normally vertical spin axis for engaging said pin to cause said rotor to precess along said finger to a central position, a shaft provided with a recess and a locking member included in said last-named means for receiving and locking said pin in its central position, and an operating knob accessible from the exterior of said casing for actuating said shaft.

12. In a caging and centralizing device for a universally mounted gyroscope comprising a rotor having a normally vertical spin axis and a rotor casing therefor, the combination with the casing of a pin carried thereby and means rotatable about an axis coaxial with said normally vertical spin axis for centering said casing about two axes thereof by engaging said pin and applying a precessive torque on said rotor, control means for actuating said last-named means, and a motor for operating said control means.

13. In a caging and centralizing device for a universally mounted gyroscope comprising a rotor having a normally vertical spin axis and a rotor casing therefor, the combination with the casing of a pin carried thereby and means rotatable about an axis coaxial with said normally vertical spin axis for centering said casing about two axes thereof by engaging said pin whereby a precessive torque is developed on said rotor, control means for actuating said last-named means, and a hand crank for operating said control means.

14. In a caging and centralizing device for a universally mounted gyroscope having a rotor provided with a normally vertical spin axis and a rotor casing therefor, the combination with the casing of a pin projecting therefrom, a member mounted for rotation about an axis coaxial with said normally vertical spin axis and for slidable movement relative to said casing for engaging said pin to cause said rotor to precess to a central position to thereby center and lock said gyroscope about two axes thereof, means for rotating said member, means including a cam for sliding said member, and control means for simultaneously actuating said two last-named means.

15. In an artificial horizon having a rotor provided with a normally vertical spin axis and a rotor casing therefor together with means mounting the casing for oscillation about two mutually perpendicular axes other than said spin axis, a pin carried by and projecting from said casing, a finger mounted for rotation about an axis coaxial with said normally vertical spin axis and for slidable movement relative to said casing for engaging said pin to cause said rotor to precess to a central position to thereby center and lock said casing about said two mutually perpendicular axes, means for rotating said finger, means comprising a cam for engaging and sliding said finger relative to said casing, and actuating means for said two last-named means.

16. In an artificial horizon having a rotor provided with a normally vertical spin axis and a rotor casing therefor together with means mounting the casing for oscillation about two mutually perpendicular axes other than said spin axis, a pin carried by and projecting from said casing, a finger mounted for rotation about an axis coaxial with said normally vertical spin axis and for slidable movement relative to said casing for engaging said pin to cause said rotor to precess to a central position to thereby center and lock said casing about said two mutually perpendicular axes, means for rotating said finger, means including a cam for sliding said finger relative to said casing, actuating means for operating said two last-named means to cage said gyroscope whereby said finger engages said pin and to uncage said gyroscope whereby said finger releases said pin, and resilient means urging said finger to a normal position when said actuating means have been operated to uncage said gyroscope.

17. In an artificial horizon having a rotor provided with a normally vertical spin axis and a rotor casing therefor, a gimbal supporting said casing for oscillation about a horizontal axis perpendicular to said spin axis, a housing supporting said gimbal and said casing for oscillation about a second horizontal axis mutually perpendicular to said first two axes, the combination with the casing of a pin projecting therefrom, means supported by said housing comprising a finger mounted for turning about an axis coaxial with said normally vertical spin axis and for slidable movement relative to said casing for engaging said pin to cause said rotor to precess along said finger to a central position, a housing for said last-named means and having an aperture formed therein, a pin adapted for movement through said aperture, means for turning said finger, means comprising a pair of cams one of which engages and slides said finger relative to said casing, the other of said cams being adapted to urge said last-named pin through said aperture, and actuating means for simultaneously operating said turning means and said pair of cams.

18. In a gyro vertical having a rotor provided with a normally vertical spin axis and a rotor casing therefor, a gimbal ring supporting said casing for oscillation about a horizontal axis perpendicular to said spin axis, a housing supporting said gimbal ring and said casing for oscillation about a second horizontal axis mutually perpendicular to said first two axes, the combination with the casing of a pin projecting therefrom, a finger mounted for turning about an axis coaxial with said normally vertical spin axis for engaging said pin to cause said rotor to precess along said finger to a central position, a rotatable and longitudinally slidable member for actuating said finger and provided with a recess and a locking member for receiving and locking said pin in its central position, means for rotating said member, means for sliding said member, and actuating means for operating said rotating and sliding means.

19. In combination with an artificial horizon having a rotor provided with a casing and an outer support mounting said casing for freedom about two mutually perpendicular axes, a pin carried by said casing, a member adapted for rotation and for sliding movement relative to said casing for engaging said pin and causing precession of said rotor whereby said casing is centered with respect to the support, control means for rotating said member, and cam means actuated by said control means for sliding said member.

20. In a caging and centralizing device for a universally mounted gyroscope comprising a rotor having a normally vertical spin axis and a rotor casing therefor, the combination with the casing of a pin projecting therefrom, a finger mounted for rotation and for sliding movement relative to said casing for engaging said pin to cause said rotor to precess to a central position to thereby centralize said casing, control means for rotating said finger, and cam means actuated by said control means for sliding said finger.

21. In a caging and centralizing device for a universally mounted gyroscope comprising a rotor having a normally vertical spin axis and a rotor casing therefor, the combination with the casing of a pin projecting therefrom, a finger mounted for rotation and for sliding movement relative to said casing for engaging said pin to cause said rotor to precess to a central position to thereby centralize said casing, means for rotating said finger, means including a cam for sliding said finger, and actuating means for simultaneously operating said two last-named means.

22. In a caging and centralizing device for a universally mounted gyroscope having a rotor mounted for spinning about one axis and means comprising a casing supporting the rotor for oscillation about two mutually perpendicular axes at right angles to said spin axis, the combination with the casing of a pin carried thereby and means rotatable about an axis coaxial with said spin axis for engaging said pin and causing precession of said rotor to a central position whereby said casing is centered about said two mutually perpendicular axes, and control means for actuating said last-named means.

23. In a caging and centralizing device for a universally mounted gyroscope having a rotor mounted for spinning about one axis and means comprising a casing supporting the rotor for oscillation about two mutually perpendicular axes at right angles to said spin axis, the combination with the casing of a pin projecting therefrom, and means comprising a finger rotatable about an axis coaxial with said spin axis for engaging said pin to cause a precession of said rotor whereby said casing becomes centralized.

24. In combination with a universally mounted gyroscope having a rotor mounted for spinning about one axis and means including a casing for supporting the rotor for oscillation about two mutually perpendicular axes at right angles to said spin axis, a pin carried by said casing, a rotatable torque exerting member comprising an extending finger for centering said rotor about said two mutually perpendicular axes by engaging said pin and causing said rotor to precess along said finger to a normally central position, and means for operating said member.

25. In combination with a universally mounted gyroscope having a rotor for spinning about one axis and means including a casing for supporting the rotor for oscillation about two mutually perpendicular axes at right angles to said spin axis, a pin carried by said casing, and means comprising a torque exerting member for engaging said pin to center said casing about said two mutually perpendicular axes by causing said rotor to precess along said member to a normally central position.

PAUL A. NOXON.